United States Patent [19]

Schürmann

[11] Patent Number: 5,513,525
[45] Date of Patent: *May 7, 1996

[54] ARRANGEMENT FOR MONITORING THE OPERATING STATE OF VEHICLE PNEUMATIC TIRES MOUNTED ON WHEEL RIMS

[75] Inventor: Josef Schürmann, Oberhummel, Germany

[73] Assignee: Texas Instruments Incorporated, Dallas, Tex.

[*] Notice: The term of this patent shall not extend beyond the expiration date of Pat. No. 5,235,850.

[21] Appl. No.: 259,603

[22] Filed: Jun. 14, 1994

Related U.S. Application Data

[63] Continuation of Ser. No. 82,078, Jun. 24, 1993, abandoned, which is a continuation of Ser. No. 818,190, Jan. 8, 1992, Pat. No. 5,235,850.

[51] Int. Cl.⁶ .................................................. B60C 23/02
[52] U.S. Cl. .......................................... 73/146.5; 340/447
[58] Field of Search .................. 73/146.5, 146.8, 73/146.2; 340/443, 445, 447, 448; 374/143

[56] References Cited

U.S. PATENT DOCUMENTS 5,235,850  8/1993  Schurmann .......................... 73/146.5

Primary Examiner—Sandra L. O'Shea
Assistant Examiner—William L. Oen
Attorney, Agent, or Firm—Rebecca A. Mapstone; James C. Kesterson; William E. Hiller

[57] ABSTRACT

An arrangement for monitoring the operating state of vehicle pneumatic tires (14) mounted on wheel rims (10) is provided with sensors (40, 42) for detecting the air pressure and the air temperature in each tire. Furthermore, it includes transmitting means comprising rim-side mounted rotor members (28) and bodywork-side mounted stator members (32) coupled thereto for transmitting the parameters detected by the sensor (40, 42) to an evaluating arrangement in the vehicle connected to the stator members. The pressure sensor (40) and the temperature sensor (42) of each tire (14) are coupled to a first transponder (44) which as reaction to an interrogation signal generated by the evaluating arrangement transmits the data supplied to it by the pressure sensor (40) and the temperature sensor (42) to the rotor members (28) of the transmitting means. Disposed in the pneumatic tire (14) is a second transponder (48) which when it receives the interrogation signal transmits data designating the type of the pneumatic tire (14) to the stator members (32).

24 Claims, 1 Drawing Sheet

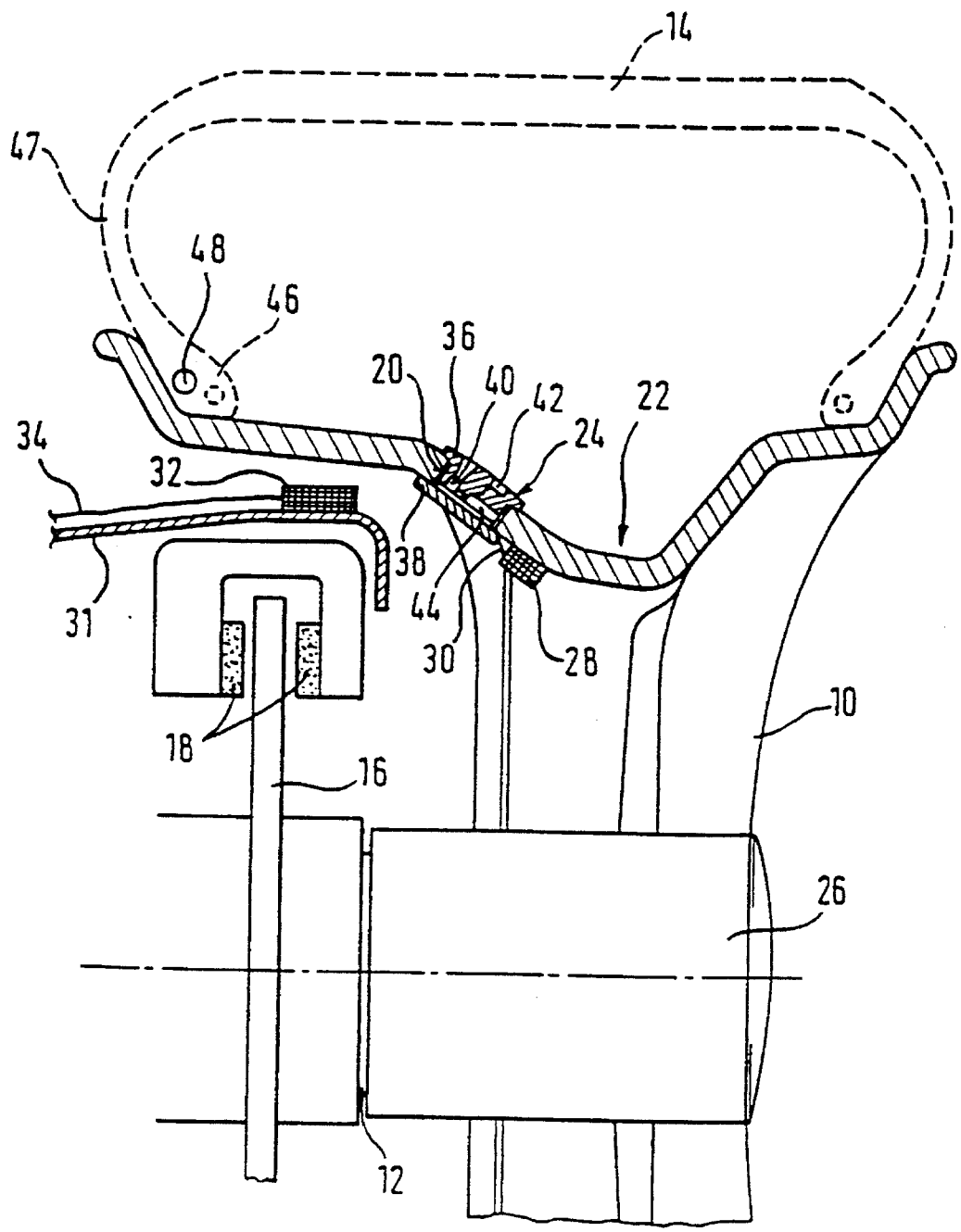

ARRANGEMENT FOR MONITORING THE OPERATING STATE OF VEHICLE PNEUMATIC TIRES MOUNTED ON WHEEL RIMS

This is a continuation, of application Ser. No. 08/082,078 now abandoned, which is a continuation of application Ser. No. 07/818,190, filed Jan. 8, 1992 now U.S. Pat. No. 5,235,850.

The invention relates to an arrangement for monitoring the operating state of vehicle pneumatic tires mounted on wheel rims comprising sensors for detecting the air pressure and the air temperature in each tire and transmitting means comprising rim-side mounted rotor members and bodywork-side mounted stator members coupled thereto for transmitting the parameters detected by the sensors to an evaluating arrangement in the vehicle connected to the stator members.

DE-A 3,029,563 discloses an arrangement with the aid of which the pressure and temperature in the interior of a vehicle pneumatic tire can be monitored. With the aid of the measurement results here an indication of the operating state of the vehicle tire is to be generated, in particular an indication whether at the operating state determined safe driving is still possible. It has however been found that the tire pressure and the temperature measured in the tire interior are not enough to provide reliable information valid at any time on the vehicle maximum velocity still safe at the conditions found.

The invention is based on the problem of providing an arrangement of the type outlined at the beginning with which it is possible to obtain a reliable indication of the maximum velocity with which the vehicle can be driven with the particular tire conditions.

According to the invention this problem is solved in that the pressure sensor and the temperature sensor of each tire are coupled to a first transponder which as reaction to an interrogation signal generated by the evaluating arrangement transmits the data supplied to said transponder by the tire pressure sensor and temperature sensor to the rotor members of the transmitting means and that in the pneumatic tires a second transponder is disposed which when it receives the interrogation signal transmits data designating the type of the pneumatic tire.

When using the arrangement according to the invention, in the calculation of the maximum velocity which when taking account of safety criteria can still be driven at the measured tire pressure and the measured tire inner temperature, not only the pressure and temperature are taken into account but also the type of the tire which from the point of view of safety has a great influence on the particular possible maximum velocities. More especially with summer tires and winter tires the velocities which are still considered safe for a given tire pressure and a specific tire inner temperature differ considerably.

Advantageous further developments of the invention are characterized in the subsidiary claims.

The invention will now be explained by way of example with the aid of the drawing, the single FIGURE of which shows a schematic illustration of a partially sectioned rim and an air tire mounted thereon having the arrangement according to the invention.

The wheel rim 10 illustrated partially in the drawing is mounted on the axle 12 of a vehicle. A schematically illustrated pneumatic tire 14 is mounted on the wheel rim 10. In addition, a brake disc 16 with associated brake pads 18 can be seen.

In an opening 20 of the wheel rim 10 in the region of the rim well 22 a measuring module 24 is disposed. The hub 26 of the wheel rim 10 is surrounded in the inwardly disposed region by an annular coil 28 which via a wire line 30 is in connection with the measuring module 24.

Associated with the annular coil 28 is a coupling coil 32 which is fixedly connected to a bodywork part 31 and which via a wire line 34 is connected to evaluating electronics not shown. Via the annular coil 28 and the associated coupling coil 32 signals coming from the measuring module 24 can be transmitted to the evaluating electronics.

The measuring module 24 consists of two parts, that is a part 36 and a part 38. The part 36 faces the tire interior and is mounted in the opening 20 of the rim 10. Said part 36 contains a pressure sensor 40 and a temperature sensor 42. These two sensors measure the pressure and temperature respectively of the air in the tire interior. The part 38 is placed like a cover from the outside onto the rim and screwed to the part 36 and the rim. Since as apparent in the drawing the part 36 has a flange which bears on the surface of the rim facing the tire interior, the air pressure in the tire effects a pressing of the part 36 against the rim so that when the pressure is increased the sealing effect is intensified. Between the peripheral flange of the part 36 and the rim a seal is inserted to improve the sealing action.

Disposed in the part 36 is a transponder 44 which is intended to transmit the measured values detected by the pressure sensor 40 and the temperature sensor 42 via the annular coil 28 to the coupling coil 32 so that they can be supplied to the evaluating electronics. The transponder 44 is a transponder of the type as described in EP-A-0 301 127. This transponder reacts to the reception of an interrogation signal by transmitting signals which represent the measured values picked up by the sensors 40 and 42. The transponder 44 does not contain its own power supply but draws its supply energy from the interrogation signal received by it. The interrogation signal, which is supplied thereto in the form of an HF pulse, is rectified in the transponder; with the DC voltage generated in this manner a capacitor serving as energy store is charged. After termination of the HF pulse said energy store supplies the power for the components contained in the transponder. The duration of the transmission of the interrogation signal and the energy store are so dimensioned that the energy stored after rectification suffices for transmission of the signals representing the measured values.

The interrogation signal is generated at predetermined intervals of time by the evaluating electronics and transmitted via the coupling coil 32 to the annular coil 28. The annular coil 28 is always at the same distance from the coupling coil 32 so that the transmission of the interrogation signal is ensured at any time.

In the region of the tire bead 46, in the pneumatic tire 14 a further transponder 48 is disposed which is embedded directly into the tire material. Said transponder 48 is of the same type as the transponder 44 but receives the signals to be transmitted by it not from sensors but from a data memory contained in it. Said data memory contains information on the tire type in which the transponder 48 is embedded. The data memory is a ROM element, i.e. a memory which permanently stores the data entered therein without supply energy having to be present for that purpose.

The transponder 48 may also be mounted on the side wall 47 of the pneumatic tire 14. This type of mounting presents itself in particular when the transponder 48 is to be subsequently used on already produced tires. In particular in the case of truck tires, which have a projecting protective bead at the side wall 47 near the tread surface, the transponder 48 can be mounted on the side of said protective bead remote from the tread surface. At this point said transponder is protected relatively well against damage.

In the transponder 48 as well the supply energy is obtained by rectification of the interrogation signal transmitted by the coupling coil 32 in the form of an HF pulse. The transponder 48 is however not in spatial vicinity to the coupling coil 32 at any time but is close enough to the coupling coil 32 to be able to receive the interrogation signal only in a certain range of angular positions of the wheel rim. This fact can be advantageously utilized in the evaluation of the signals furnished by the transponders 44 and 48.

When the vehicle equipped with the arrangement to be described is stationary and the evaluating electronics in the vehicle supply an interrogation signal to the coupling coil 32, said interrogation signal is acquired by the annular coil 28 and passed on to the transponder 44. Said transponder 44 reacts thereto by transmitting the signals representing the detected measured values. If due to the chance angular position of the wheel rim 10 the transponder 48 is further than its receiving range from the coupling coil 32 it cannot react to the interrogation signal. The interrogation electronics continue to transmit the interrogation signal at short intervals of time but as response always receive only the signals representing the measured values detected by the sensors 40 and 42.

Now, when the vehicle starts to move, the transponder 48 approaches the coupling coil 32 until the distance therefrom is smaller than its receiving range. The duration and energy content of the interrogation signal are chosen so that during the slow moving of the transponder 48 past the coupling coil 32 it is certain that a complete receiving and response cycle of the transponder 48 can take place. This means that the duration of the interrogation signal is made substantially shorter than the time for which the coupling coil 32 is in the receiving range of the transponder 48 during the startup phase.

To enable the response signal sent back by the transponder 48 as reaction to the interrogation signal to be processed reliably by the evaluating electronics without being disturbed by the response signal of the transponder 44, which of course has also been transmitted as reaction to the interrogation signal, the transponder 48 is so configured that its transmitting power is at least 3 to 6 dB higher than that of the transponder 44. As a result, the response signal of the transponder 44 is completely covered by the response signal of the transponder 48 so that only the latter response signal will be processed in the evaluating electronics and identification of the tire type will be possible.

The same effect can also be achieved if the coupling coil 32 and the two transponders 44 and 48 are so arranged in their spatial position relatively to each other that the transponder 48 on transmitting its response signal can generate at the location of the coupling coil a higher field strength than the transponder 44. As a result, in the startup phase the response signal of the transponder 48 can be evaluated without any disturbance from the response signal of the transponder 44.

When the vehicle speed is increased the time for which the coupling coil is disposed in the receiving range of the transponder 48 becomes increasingly smaller until finally the state is reached in which the residence time no longer suffices to supply the transponder 48 with the energy it requires to send back the data stored in it. Thus, after reaching a predetermined rotational speed of the vehicle tires the transponder 48 is no longer activated by the interrogation signal and consequently the evaluating electronics then receive only the response signals of the transponder 44 which represent the air pressure and the air temperature in the tire.

In the arrangement described the evaluating electronics thus receive information on the type of tires used at the latest in the startup phase of the vehicle whereas when the rotational velocity of the tires increases it receives only information on the pressure and temperature in the tire interior.

However, the evaluating electronics receive the information on the pressure and temperature in the tire interior not only at relatively high speed but also at a standstill and in the startup phase whenever the distance between the transponder 48 and the coupling coil 32 is greater than the receiving range of the transponder 48. Thus, for example, if after the vehicle has come to a stop the air has escaped from a tire and the transponder 48 happens to assume the position shown in the drawing relatively to the coupling coil 32, although directly after coming into operation the evaluating electronics firstly receive only the response signals from the transponder 48 with the information on the tire type, at the latest after about one quarter revolution of the tire the evaluation electronics no longer receive the signals from the transponder 48 but the signals from the transponder 44 which indicate the pressure loss in the tire. There is therefore no danger of the vehicle being moved until a relatively high speed is achieved without any reporting of the pressure loss occurring leading to a corresponding display in the vehicle.

I claim:

1. System for monitoring the operating state of vehicle pneumatic tires, which are comprised of tire material and have tire beads and side walls, mounted on wheel rims comprising:

sensors for detecting either the air pressure of the air temperature in each tire, and not both;

transmitting means comprising rim-side mounted rotor members and bodywork-side mounted stator members coupled thereto for transmitting the parameters detected by said sensors to an evaluating arrangement in a vehicle connected to the stator members;

a first transponder, coupled to said temperature sensor or said pressure sensor, but not both, which in response to an interrogation signal generated by the evaluating arrangement, transmits either temperature data or pressure data supplied to said transponder by the sensor to the rotor members of the transmitting means;

a second transponder, which is disposed in the pneumatic tires, and which, in response to an interrogation signal generated by the evaluating arrangement, transmits data to the stator members designating the type of the pneumatic tire.

2. System according to claim 1, wherein the transmitting power of the second transponder is higher than the transmitting power of the first transponder.

3. System according to claim 2, wherein the difference between the transmitting powers of the first and second transponders is greater than 1.5 Db.

4. System according to claim 2, wherein the difference between the transmitting powers of the first and second transponders falls within the range from 3 to 6 Db.

5. System according to claim 1, wherein the second transponder is embedded into the tire material in the region of the tire bead.

6. System according to claim 1, wherein the second transponder is mounted to a side wall of the pneumatic tire.

7. System according to claim 1, wherein the first and second transponders are batteryless transponders which obtain their supply energy from the interrogation signal received by them.

8. System according to claim 1, wherein the stator members are located with respect to the first and second transponders such that the second transponder is operable to generate a maximum field strength at the stator members that is greater than the field strength which can be generated by the first transponder.

9. System for monitoring the operating state of vehicle pneumatic tires, which are comprised of tire material and have tire beads and side walls, mounted on wheel rims comprising:

sensor for detecting the air pressure in each tire;

transmitting means comprising rim-side mounted rotor members and bodywork-side mounted stator members coupled thereto for transmitting the parameters detected by the sensor to an evaluating arrangement in a vehicle connected to the stator members;

a first transponder, coupled to said pressure sensor, which in response to an interrogation signal generated by the evaluating arrangement, transmits pressure data supplied to said transponder by the pressure sensor to the rotor members of the transmitting means;

a second transponder, which is disposed in the pneumatic tires, and which, in response to an interrogation signal generated by the evaluating arrangement, transmitting data to the stator members designating the type of the pneumatic tire.

10. System according to claim 9, wherein the stator members are located with respect to the first and second transponders such that the second transponder is operable to generate a maximum field strength at the stator members that is greater than the field strength which can be generated by the first transponder.

11. System according to claim 9, wherein the transmitting power of the second transponder is higher than the transmitting power of the first transponder.

12. System according to claim 11, wherein the difference between the transmitting powers of the first and second transponders is greater than 1.5 dB.

13. System according to claim 11, wherein the difference between the transmitting powers of the first and second transponders falls within the range from 3 to 6 dB.

14. System according to claim 9, wherein the second transponder is embedded into the tire material in the region of the tire bead.

15. System according to claim 9, wherein the second transponder is mounted on a side wall of the pneumatic tire.

16. System according to claim 9, wherein the first and second transponders are batteryless transponders which obtain their supply energy from the interrogation signal received by them.

17. System for monitoring the operating state of vehicle pneumatic tires, which are comprised of tire material and have tire beads and side walls, mounted on wheel rims comprising:

sensor for detecting the air temperature in each tire;

transmitting means comprising rim-side mounted rotor members and bodywork-side mounted stator members coupled thereto for transmitting the parameter detected by the sensor to an evaluating arrangement in a vehicle connected to the stator members;

a first transponder, coupled to said temperature sensor, which in response to an interrogation signal generated by the evaluating arrangement, transmits temperature data supplied to said transponder by the temperature sensor to the rotor members of the transmitting means;

a second transponder, which is disposed in the pneumatic tires, and which, in response to an interrogation signal generated by the evaluating arrangement, transmits data to the stator members designating the type of the pneumatic tire.

18. System according to claim 17, wherein the stator members are located with respect to the first and second transponders such that the second transponder is operable to generate a maximum field strength at the stator members that is greater than the field strength which can be generated by the first transponder.

19. System according to claim 17, wherein the transmitting power of the second transponder is higher than the transmitting power of the first transponder.

20. System according to claim 19, wherein the difference between the transmitting powers of the first and second transponders is greater than 1.5 dB.

21. System according to claim 19, wherein the difference between the transmitting powers of the first and second transponders falls within the range from 3 to 6 dB.

22. System according to claim 17, wherein the second transponder is embedded into the tire material in the region of the tire bead.

23. System according to claim 17, wherein the second transponder is mounted on a side wall of the pneumatic tire.

24. System according to claim 17, wherein the first and second transponders are batteryless transponders which obtain their supply energy from the interrogation signal received by them.

\* \* \* \* \*